US009663106B1

(12) United States Patent
Almutairi

(10) Patent No.: US 9,663,106 B1
(45) Date of Patent: May 30, 2017

(54) SYSTEMS, APPARATUSES AND METHODS TO CONTROL ONE OR MORE MULTIDIRECTIONAL WHEELS

(71) Applicant: Abdulrahman Sadun Almutairi, Mankato, MN (US)

(72) Inventor: Abdulrahman Sadun Almutairi, Mankato, MN (US)

( * ) Notice: Subject to any disclaimer, the term of this patent is extended or adjusted under 35 U.S.C. 154(b) by 37 days.

(21) Appl. No.: 14/978,828

(22) Filed: Dec. 22, 2015

(51) Int. Cl.
| | | |
|---|---|---|
| *B60B 19/14* | (2006.01) | |
| *B60W 30/18* | (2012.01) | |
| *B60K 7/00* | (2006.01) | |
| *B60W 10/184* | (2012.01) | |
| *B60W 10/08* | (2006.01) | |
| *B62D 9/00* | (2006.01) | |
| *A63C 17/12* | (2006.01) | |
| *A63C 17/01* | (2006.01) | |
| *B62M 7/12* | (2006.01) | |
| *A63C 17/00* | (2006.01) | |
| *A63C 17/14* | (2006.01) | |
| *A63C 17/24* | (2006.01) | |

(52) U.S. Cl.
CPC ............ *B60W 30/18* (2013.01); *B60B 19/14* (2013.01); *B60K 7/0007* (2013.01); *B60W 10/08* (2013.01); *B60W 10/184* (2013.01); *B62D 9/00* (2013.01); *A63C 17/004* (2013.01); *A63C 17/011* (2013.01); *A63C 17/12* (2013.01); *A63C 17/14* (2013.01); *A63C 17/24* (2013.01); *B62M 7/12* (2013.01)

(58) Field of Classification Search
CPC .... B60W 30/18; B60W 10/08; B60W 10/184; B62M 7/12; B60B 19/14; B60K 7/0007; B62D 9/00; A63C 17/004; A63C 17/011; A63C 17/12; A63C 17/14; A63C 17/24
USPC ............................... 180/7.1, 20, 65.1
See application file for complete search history.

(56) References Cited

U.S. PATENT DOCUMENTS

| | | | | |
|---|---|---|---|---|
| 1,928,412 | A * | 9/1933 | Deninson ............... | B62D 57/00 180/21 |
| 4,413,693 | A * | 11/1983 | Derby .................... | A61G 5/043 180/21 |
| 5,419,008 | A * | 5/1995 | West ....................... | B25J 5/005 16/25 |
| 8,459,383 | B1 * | 6/2013 | Burget .................... | B60B 19/14 180/7.1 |
| 9,427,649 | B2 * | 8/2016 | Teevens ............... | A63B 69/345 |

(Continued)

FOREIGN PATENT DOCUMENTS

| | | |
|---|---|---|
| FR | 2 960 930 A1 | 12/2011 |
| JP | 2009 234524 A | 10/2009 |
| WO | 87/06536 A1 | 11/1987 |

*Primary Examiner* — John Walters
(74) *Attorney, Agent, or Firm* — Oblon, McClelland, Maier & Neustadt, L.L.P.

(57) ABSTRACT

A multidirectional wheel system, apparatus, and method to control one or more multidirectional wheels to provide multidirectional motion or movement for a movable apparatus, such as a skateboard, roller blades, a car, a motorcycle, a cleaning robot, to which the one or more multidirectional wheels are attached. The multidirectional wheel system can include a braking system to slow and/or stop the movement of the multidirectional wheel(s). At least one of the multidirectional wheels can be an omnidirectional wheel(s), with a plurality of multidirectional wheels acting thereon to control movement thereof.

20 Claims, 7 Drawing Sheets

(56) References Cited

U.S. PATENT DOCUMENTS

2008/0283311 A1    11/2008  Li
2010/0243342 A1*   9/2010   Wu ........................ B60B 19/14
                                                         180/7.1

* cited by examiner

SYSTEMS, APPARATUSES AND METHODS TO CONTROL ONE OR MORE MULTIDIRECTIONAL WHEELS

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

SUMMARY

Embodiments of the disclosed subject matter relate generally to systems, apparatuses, and methods for controlling one or more multidirectional wheels. More specifically, embodiments of the disclosed subject matter are directed to implementing one or more multidirectional wheels to provide multidirectional motion for various objects (e.g., skateboards, roller blades, cars, motorcycles, floor cleaning robots, etc.) to which the one or more multidirectional wheels are attached. As used herein, the term multidirectional can include movement in 360° of direction along a predetermined plane (i.e., omnidirectional movement).

According to embodiments of the disclosed subject matter, an apparatus can comprise a multidirectional wheel system; and circuitry configured to determine if a signal is received from an electronic control device, determine if a braking system is activated, activate at least one of extending one or more connection members, disk brakes, and rotating one or more wheels in a direction opposite that of the rotation of a sphere supporting at least a portion of the apparatus when the braking system is activated, adjust the one or more wheels to a predetermined position in response to the signal being received from the electronic control device, and activate a motor disposed in each of the one or more wheels when the one or more wheels are adjusted to the predetermined position causing the sphere to rotate in a predetermined direction, thereby causing the apparatus to move in the predetermined direction.

A method for causing the apparatus to move can comprise determining, via processing circuitry, if a signal is received from an electronic control device; determining, via processing circuitry, if a braking system is activated; activating at least one of extending one or more connection members, disk brakes, and rotating one or more wheels in a direction opposite that of the rotation of a sphere supporting at least a portion of the apparatus when the braking system is activated; adjusting the one or more wheels to a predetermined position in response to the signal being received from the electronic control device; and activating a motor disposed in each of the one or more wheels when the one or more wheels are adjusted to the predetermined position causing the sphere to rotate in a predetermined direction, thereby causing the apparatus to move in the predetermined direction.

A system can comprise at least one sensor; a braking system; one or more multidirectional wheel devices; and circuitry configured to determine if a signal is received from an electronic control device, determine if a braking system is activated, activate at least one of extending one or more connection members, disk brakes, and rotating one or more wheels in a direction opposite that of the rotation of a sphere supporting at least a portion of the apparatus when the braking system is activated, adjust the one or more wheels to a predetermined position in response to the signal being received from the electronic control device, and activate a motor disposed in each of the one or more wheels when the one or more wheels are adjusted to the predetermined position causing the sphere to rotate in a predetermined direction, thereby causing the apparatus to move in the predetermined direction.

A wheel control system can comprise an omnidirectional spherical wheel; a wheel control assembly physically and operatively coupled to the omnidirectional spherical wheel to control movement of the omnidirectional spherical wheel, the wheel control assembly including a plurality of extendable/retractable members each having a motorized roller at an end thereof and controllable to an extended state where the roller contacts the omnidirectional spherical wheel and to a non-extended state where the roller does not contact the omnidirectional spherical wheel; and circuitry to control the wheel control assembly, the circuitry being configured to determine whether an electronic control device is activated, determine whether a braking system is activated, and control individually each of the extendable/retractable members to collectively stop, slow down, maintain speed of, speed up, or change direction of the omnidirectional spherical wheel based on the determinations as to whether the electronic control device and the braking system are activated, wherein a first set of at least one of the extendable/retractable members is disposed to contact an upper hemisphere portion of the omnidirectional spherical wheel in the extended state, a second set of at least one of the extendable/retractable members is disposed to contact a western hemisphere portion of the omnidirectional spherical wheel in the extended state, and a third set of at least one of the extendable/retractable members is disposed to contact an eastern hemisphere portion of the omnidirectional spherical wheel in the extended state.

A method for causing an apparatus having a plurality of multidirectional wheels and an omnidirectional wheel to move can comprise determining, using processing circuitry, whether a signal is received from an electronic control device; determining, using the processing circuitry, whether a braking system is activated; activating at least one of one or more wheel control members associated with each of the multidirectional wheels and disk brakes responsive to the braking system being activated; adjusting one or more of the multidirectional wheels to a predetermined position relative to the omnidirectional wheel in response to the signal being received from the electronic control device; and activating a motor disposed to control each of the multidirectional wheels when the one or more multidirectional wheels are adjusted to the predetermined position and causing the multidirectional wheel to rotate in a predetermined direction, thereby causing the apparatus to move in the predetermined direction.

A vehicle can comprise a plurality of multidirectional wheels; a wheel control assembly operatively coupled to each of the multidirectional wheels to control movement of the multidirectional wheel, each wheel control assembly including at least one extendable/retractable member having a roller at an end thereof and controllable to move to an extended state where the roller contacts the multidirectional wheel and to a fully retracted state where the roller does not contact the multidirectional wheel; and control circuitry to control the wheel control assemblies, the control circuitry being configured to control individually each of the extendable/retractable members to collectively stop, slow down, maintain speed of, speed up, or change direction of the vehicle based on one or more user inputs to control speed and direction of the vehicle and based on an input from one or more vehicle sensors.

The foregoing paragraphs have been provided by way of general introduction, and are not intended to limit the scope of the claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
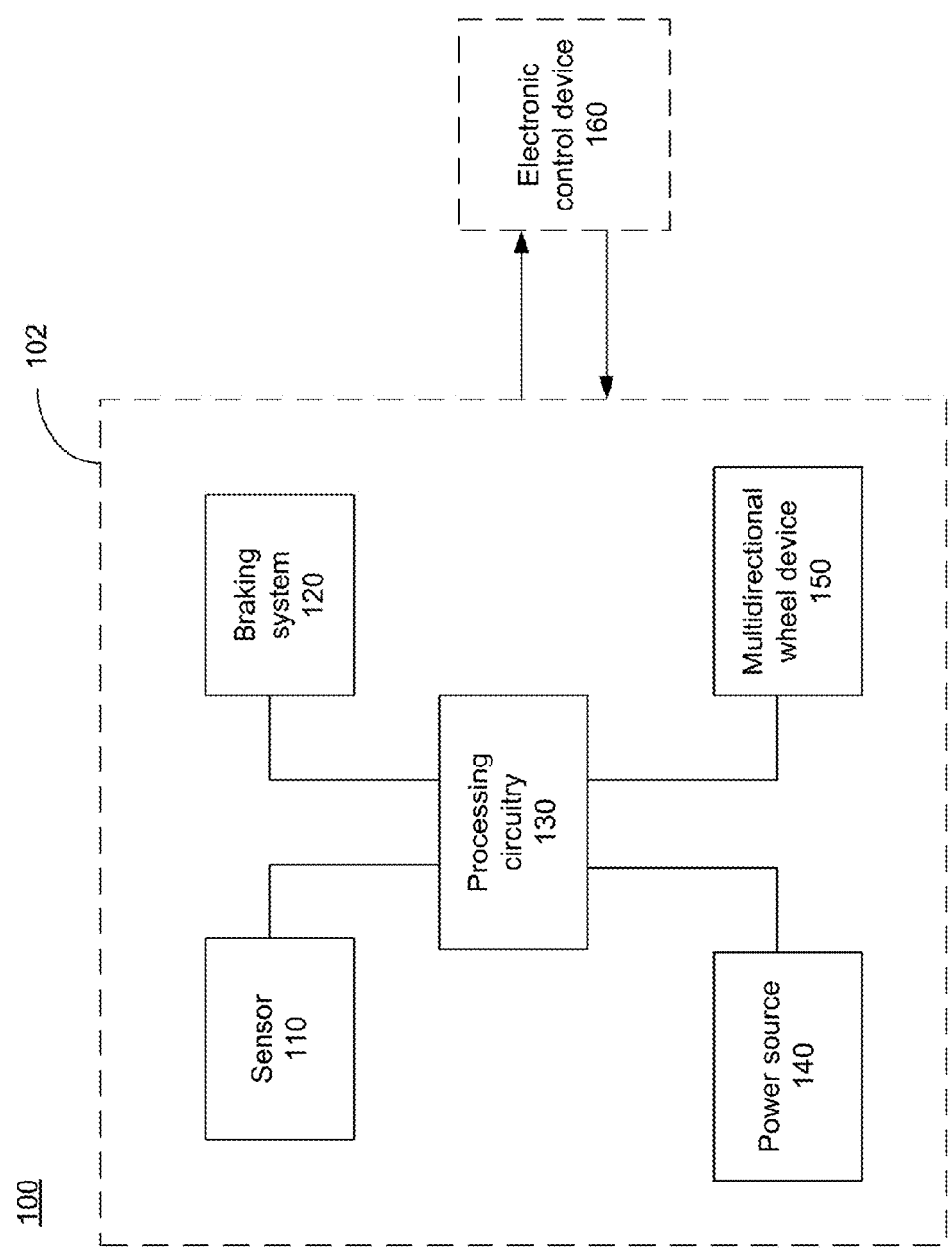
FIG. 1 is a block diagram of a multidirectional wheel control system according to one or more embodiments of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

As noted above, embodiments of the disclosed subject matter relate generally to systems, apparatuses, and methods for controlling multidirectional wheels, particularly implementing one or more multidirectional wheels to provide 360° directional motion or movement movable object, such as a vehicle.

Referring now to the drawings, wherein like reference numerals designate identical or corresponding parts throughout the several views.

FIG. 1 is a block diagram of a multidirectional wheel control system 100 (herein referred to as system 100) according to one or more embodiments of the disclosed subject matter. As will be discussed in more detail later, one or more methods according to various embodiments of the disclosed subject matter can be implemented using the system 100 or portions thereof. Put another way, system 100, or portions thereof, can perform the functions or operations described herein regarding the various methods or portions thereof (including those implemented using a non-transitory computer-readable medium storing a program that, when executed, configures or causes a computer to perform or cause performance of the described method(s) or portions thereof).

System 100 can comprise at least one sensor 110, a braking system 120, a processor or processing circuitry 130 (which can include internal and/or external memory), a power source 140, and at least one multidirectional wheel device 150. Optionally, system 100 can be comprised of an electronic control device 160 to control one or more portions of the system 100, for instance, via wired connection or wirelessly. In one or more embodiments, the sensor 110, the braking system 120, the processor or processing circuitry 130, the power source 140, and the at least one multidirectional wheel device 150 can implemented in a stand-alone apparatus 102, such as a roller skate or a vehicle, for instance. Further, the aforementioned components can be electrically connected or in electrical or electronic communication with each other as diagrammatically represented by FIG. 1, for example.

Generally speaking, system 100 can cause or allow an object to move in 360° of movement across a predetermined plane via the at least one multidirectional wheel device 150. Based on signals received from the at least one sensor 110, signals received from the electronic control device 160, and/or gravitational effects, the system 100 can be moved or be caused to move in a corresponding direction.

More specifically, based on various received signals (e.g., from sensors 110, electronic control device 160, etc.), the system 100 can move the object in a corresponding direction, at a maintained or modified speed (i.e., increased or decreased), using the at least one multidirectional wheel device 150 and/or slow movement, maintain speed, or stop movement of the object using the braking system 120.

The at least one sensor 110 can include various sensors to detect motion, weight, strain, position, and the like as further described herein. The types of sensors 110 can include an accelerometer, a gyroscope, a pressure plate, a strain gauge, a positioning system (e.g., GPS), and the like. Multiple same or different sensor types of the foregoing may be implemented.

An accelerometer can be used to monitor stability of the object, for example, to determine whether the at least one multidirectional wheel device 150 requires assistance to maintain the balance of the stand-alone apparatus 102. Similarly, a gyroscope, a pressure plate, a strain gauge, and a positioning system can be used to monitor the status of the system 100 relative to predetermined thresholds, for instance.

The braking system 120 can include various braking techniques. The braking system 120 can be implemented to slow, maintain speed of, and/or stop the multidirectional wheel device 150, thereby slowing, maintaining speed of, and/or stopping the stand-alone apparatus 102 to which the multidirectional wheel system 100 is disposed in and/or on.

Each at least one multidirectional wheel device 150 can include a sphere (e.g., an omnidirectional spherical wheel) supporting all or a portion of the weight of the stand-alone apparatus 102. The at least one multidirectional wheel device 150 can include one or more wheels or rollers in frictional contact with the sphere, such that the direction that the sphere can be rotated via the one or more wheels or rollers, as further described herein. Optionally, the wheels or rollers may be selectively extended or retracted to contact, not contact, increase contact with, or decrease contact with the sphere.

The processor or processing circuitry 130 can carry out instructions to perform or cause performance of various functions, operations, steps or processes of the system 100. The processor/processing circuitry 130 can be configured to store information in memory, operate the system 100, control the braking system 120, control the at least one multidirectional wheel devices 150, receive and send information in the form of signal(s) from the at least one sensor 110, and the like. Processor/processing circuitry 130 can also receive and/or send signals from/to the electronic control device 160.

The power source 140 can include batteries, a rechargeable battery or batteries, a fuel cell, and the like. Further, the power source 140 can provide electricity to operate various components of the system 100, including the at least one sensor 110, the braking system 120, the processing circuitry 130, and the at least one multidirectional wheel device 150.

Optionally, the system 100 can be comprised of electronic control device 160. Electronic control device 160 can be communicably coupled to stand-alone apparatus 102, either via wiring and/or wirelessly, to control system 100. Optionally, the electronic control device 160 can receive signals from stand-alone apparatus 102. For example, the received signals can be representative of signal(s) to control movement and/or speed of the object, the sphere of the at least one multidirectional device 150, and/or the wheels or rollers of the at least one multidirectional device, an operating status of one or more components of the stand-alone apparatus 102, such as battery level, warning of an exceeded weight limit supported by the system 100, error signals, etc. The electronic control device 160 can include a remote control, a smart phone, a tablet, a joystick, and the like. The electronic control device 160 can cause an omnidirectional spherical wheel to move in correspondence therewith. The electronic control device 160 can stop, slow down, maintain speed of, speed up, or change direction of the omnidirectional spherical wheel based on the signal(s) from the electronic control device 160 via various frictional contacts between wheels/rollers included in the multidirectional wheel device 150 and the omnidirectional spherical wheel, which may also be included in the multidirectional wheel device 150.

Figure 2A:
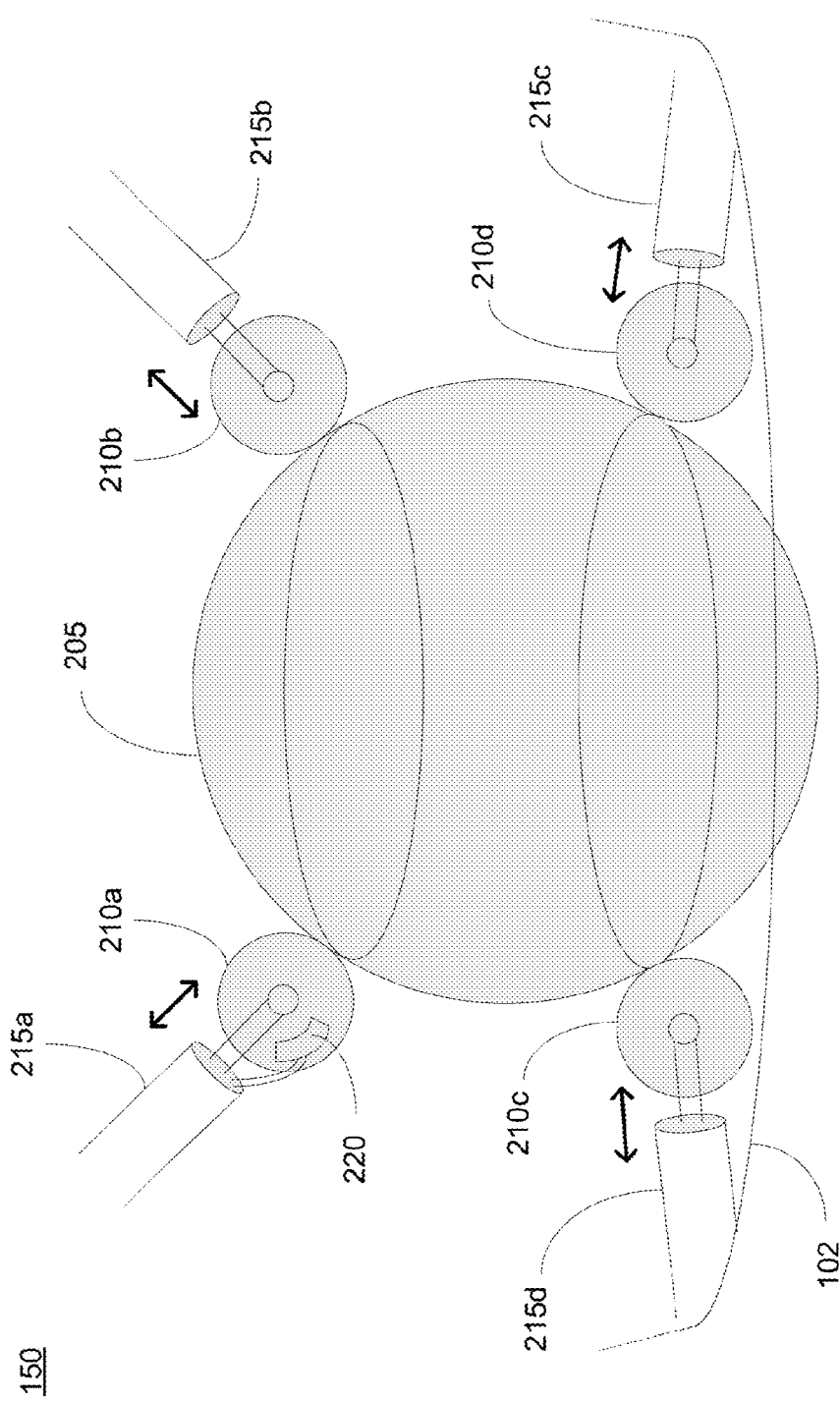
FIG. 2A depicts an exemplary side view of a portion of a multidirectional wheel control device according to a non-limiting embodiment of the disclosed subject matter.

FIG. 2A depicts an example of a portion of the multidirectional wheel device 150 according to one or more embodiments of the disclosed subject matter. The multidirectional wheel device 150 can include a sphere 205, wheels or rollers 210a-210d, and connection members 215a-215d. Although four wheels 210a-210d and four corresponding connection members 215a-215d are illustrated, it should be appreciated that any range of one or more wheels 210a-210d and corresponding connection members 215a-215d may be used in multidirectional wheel device 150. For example, a first set of at least one connection member 215 may be arranged to act on an upper hemisphere of the sphere 205, a second set of at least one connection member 215 may be arranged to act on a western hemisphere of the sphere 205, and a third set of at least one connection member 215 may be arranged to act on an eastern hemisphere of the sphere 205. Optionally, a fourth set of at least one connection member 215 may be arranged to act on a lower hemisphere of the sphere 205. FIG. 2A, for instance, shows first through fourth sets of connection members, where each set includes one connection member. Of course, in embodiments, connection members may be grouped according to two sets. For instance, a connection member 215 in an upper hemisphere may also be considered to be in one of the eastern or western hemispheres of the sphere.

The wheels 210a-210d can be in frictional contact with the sphere 205. The wheels 210a-210d can be circumferentially aligned, for example, although it should be appreciated that the wheels 210a-210d can be placed in frictional contact in any non-overlapping locations on the sphere 205. Each wheel 210a-210d can include a motor to operate the corresponding wheel 210a-210d as would be known to one of ordinary skill in the art. The motor for each wheel can be in electronic communication with and controlled by the processing circuitry 130. The wheels 210a-210d can also be swivelably attached to the connection members 215a-215d, thereby allowing the direction of each corresponding wheel 210a-210d to rotate 360° while maintaining frictional contact with the sphere 205. The swivelable connection can also be in electronic communication with and controlled by the processing circuitry 130. That is, the wheels 210 may be allowed to freely swivel when in contact with the sphere 205 or may have controlled swivel when in contact with the sphere 205. Optionally, the wheels 210 may be allowed to freely swivel when not in contact with the sphere 205, or may be locked or subject to controlled swivel when not in contact with the sphere 205.

Each connection member 215a-215d can be connected to the apparatus in which the multidirectional wheel 150 is disposed, such that the connection is on the end opposite the swivelably connected wheels 210a-210d. Additionally, each connection member 215a-215d can be extended (or further extended from an extended state) such that the extension of the of the connection member 215a-215d can increase the frictional contact with the sphere, and can be retracted (or further retracted) such that retraction of the connection member 215a-215d can decrease frictional contact with the sphere 205. Further, the retraction of the connection member 215a-215d can remove any frictional contact between the wheel 210a-210d and the sphere 205, thereby allowing the sphere 205 to be removed for maintenance, replacement, and the like, for example. No frictional contact between the wheel and the sphere can be in a fully retracted state or a non-extended state. Of course, extension and retraction of the connection members, and thus the wheels, does not need to be linear. For example, in one or more embodiments of the disclosed subject matter, the wheels may be rotated in a first direction to an extended position contacting the sphere and rotated in a second direction opposite the first direction to a non-extended position. Further, extension and/or retraction may include one or more states. For example, extension may proceed from a fully retracted state to an intermediate state where the wheel is not contacting the sphere but closer to the sphere than in the fully retracted state, to an extended state where the wheel contacts the sphere, to another extended state where the wheel contacts the sphere with even more force, for example, a linearly increasing for or a progressively increasing force. Likewise, retraction may proceed from the wheel contacting the sphere with even more force as discussed above, to the extended state above where the wheel contacts the sphere, to the intermediate state where the wheel is not contacting the sphere, to a fully retracted state. Further, connection members 215a-215d can be extended retracted via a linear motor actuator, a pneumatic actuator, and the like, such that the one or more of the actuators may be in one of the extended state(s) and one or more may be in retracted state(s), thus, one or more may contact the sphere 205 (via the connected wheels 210a-210d) and one or more may not contact the sphere 205. Optionally, or additionally, one or more of the connection members 215a-215d may contact the sphere 205 so as to apply a first force and one or more of the connection members 215a-215d may a contact the sphere 205 so as to apply a second force, which can be more or less force applied than the first force, for example.

Each wheel 210a-210d can also include the braking system 120, which can include known braking features such as a disk brake 220, which can include calipers and brake pads, such that a disk brake braking system is implemented. Because the disk brake 220 can be applied to the wheels 210a-210d, the resulting friction from the frictional contact between the wheels 210a-210d and the sphere 205 can increase, effectively applying the braking system 120 to the sphere 205. The braking system 120 can be controlled electronically, for example, by the electronic control device 160 using the processing circuitry 130. Optionally, or additionally, the braking system 120 can be implemented via the retractably connected connection members 215a-215d by extending the connection members 215a-215d, thereby applying an increased frictional force between each wheel 210a-210d and the sphere 205, effectively implementing the braking system 120 on the sphere 205. Though FIG. 2A shows only one disk brake 220, a disk brake may be provided for each wheel 210a-210d. Alternatively, disk brakes may be provided only for "upper" wheels 210a, 210b, or only for "lower" wheels 210c and 210d. Alternatively, no disk brakes 220 may be provided.

For example, the wheels 210a-210d may be turned 90° relative to direction of rotation of the sphere 205 to prevent the wheels 210a-210d from rotating, thereby further increasing the frictional contact. Optionally, or additionally, the braking system 120 can be implemented on sphere 205 rotating in a first direction, such that the wheels 210a-210d begin rotating in a direction that can cause the sphere 205 to attempt to rotate in a second direction, such that the second direction is opposite the first direction of the sphere 205. For example, if the sphere 205 is rotating in the first direction, each wheel 210a-210d can be positioned, via the swivelable connection, such that a motor of the respective wheels can cause the wheels 210a-210d to rotate in a predetermined direction, thereby implementing the braking system 120 via the opposite force applied to the current rotation of the sphere 205 by each wheel 210a-210d.

It should be appreciated that the sphere 205 can extend a predetermined amount beyond the stand-alone apparatus 102, as illustrated in FIG. 2A, such that the sphere 205 can rotate while supporting the stand-alone apparatus 205, thereby preventing the stand-alone apparatus 102 from contacting a surface on which the sphere 205 is rotating.

It should also be appreciated that the multidirectional wheel device 150 can include a gyroscope, where a signal from the gyroscope can activate one or more portions of the at least one multidirectional wheel device 150. For example, should the gyroscope detect a tilt in a direction, the gyroscope can send a signal to position one or more of the wheels 210a-210d and activate the respective motor(s) in each wheel to a predetermined output level based on the amount of detected tilt, thereby causing movement via rotation of the sphere 205 in the predetermined direction.

Figure 2B:
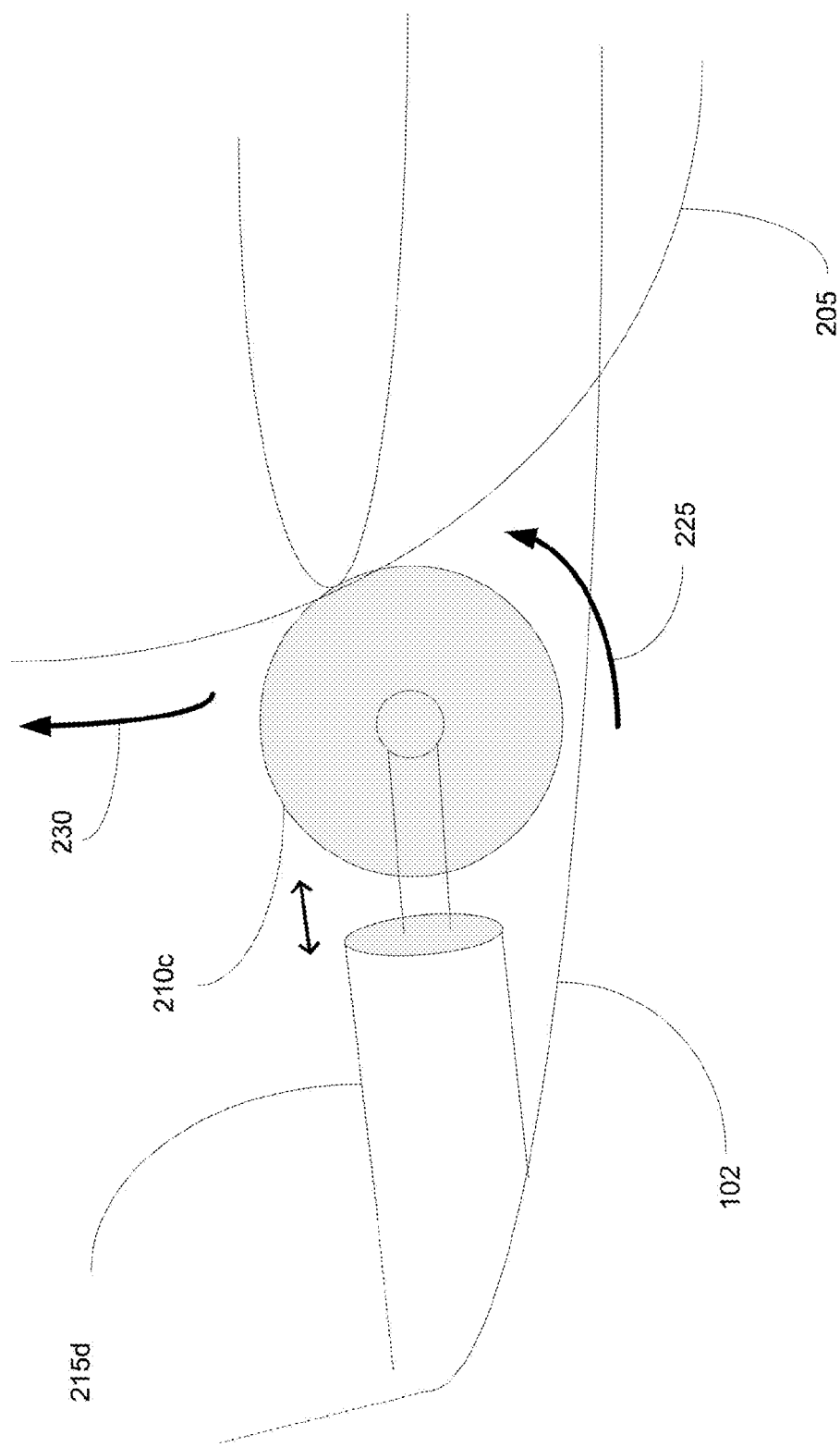
FIG. 2B depicts a zoomed in view of the portion of the multidirectional wheel device of FIG. 2A and an example of operation thereof.

FIG. 2B depicts a close up view of the wheel 210c contacting the sphere 205 according to one or more embodiments of the disclosed subject matter. The direction of rotation of the wheel 210c is depicted by a first arrow 225. The direction of rotation of the sphere 205 is depicted by a second arrow 230. The direction of rotation of the sphere 205 can be directly related to the direction of rotation of the wheel 210c in combination with the direction the wheel 210c is pointing, which can be adjusted by the swivelable connection between the wheel 210c and the connection member 215d. The position of the wheel 215 and the direction of the rotation of the wheel 215, which can be activated by the aforementioned motor disposed in or with each wheel 210a-210d, can translate to a force applied to the sphere 205, thereby causing the sphere 205 to rotate in the direction of the second arrow 230 due to the frictional contact between the wheel 210c and the sphere 205. It should be appreciated that the functionality described in FIG. 2B can be applied to any number of wheels 210a-210d disposed in the system 100, and the zoomed in view and discussion of wheel 210c is only meant to be illustrative.

It should be appreciated that FIGS. 3A-3D can include one or more multidirectional wheel devices 150, such that the one or more multidirectional wheel devices 150 are all included in the system 100 and operated by the processing circuitry 130. Alternatively, each multidirectional wheel device 150 may have its own processing circuitry 130.

Figure 3A:
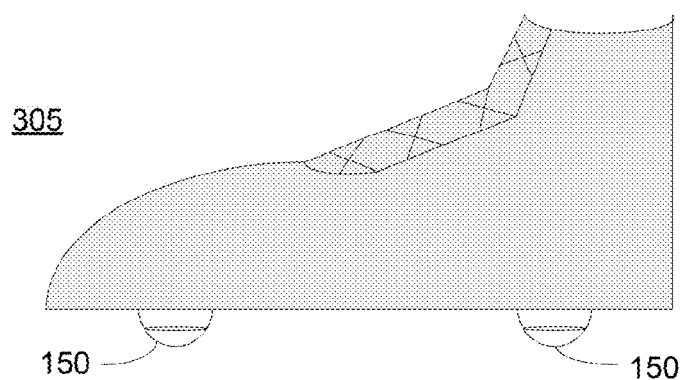
FIG. 3A depicts a side view of the multidirectional wheel system according to one or more embodiments of the disclosed subject matter implemented in a roller skate or a rollerblade, which is illustrated diagrammatically.

FIG. 3A diagrammatically depicts a view of a roller skate 305 according to one or more embodiments of the disclosed subject matter. The roller skate 305 can correspond to the stand-alone apparatus 102. Each multidirectional wheel device 150 can extend a predetermined amount from the roller skate 305, such that the roller skate 305 is supported by the one or more multidirectional wheels devices 150 and the roller skate 305 is not in contact with the surface on which the one or more multidirectional wheels devices 150 are contacting. Each multidirectional wheel device 150 can operate as part of the system 100 disposed within the roller skate 305, such as described above.

Figure 3B:
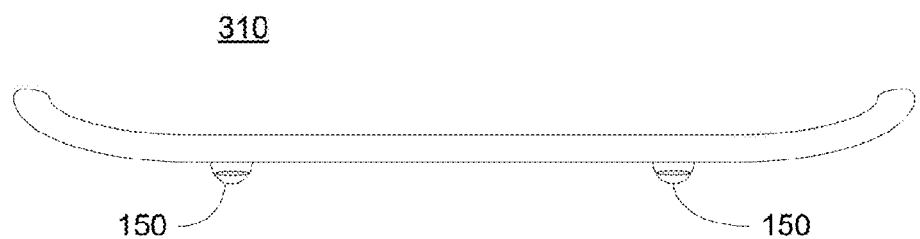
FIG. 3B depicts a side view of the multidirectional wheel system according to one or more embodiments of the disclosed subject matter implemented in a skateboard, which is illustrated diagrammatically.

FIG. 3B diagrammatically depicts a view of a skateboard 310 according to one or more embodiments of the disclosed subject matter. The skateboard 310 can correspond to the stand-alone apparatus 102. The one or more multidirectional wheel devices 150 can extend a predetermined amount from the skateboard 310, such that the skateboard 310 is supported by the one or more multidirectional wheels devices 150 and the skateboard 310 is not in contact with the surface on which the one or more multidirectional wheels devices 150 are contacting. Each multidirectional wheel device 150 can operate as part of the system 100 disposed within the skateboard 310, such as described above.

Figure 3C:
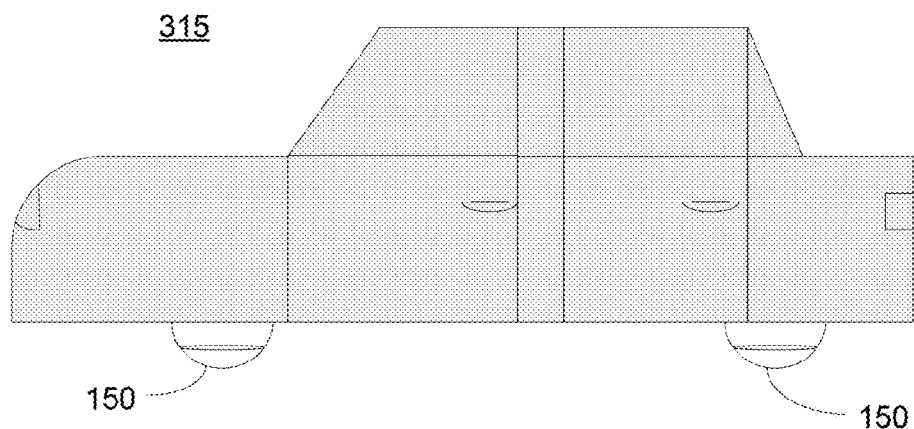
FIG. 3C depicts a side view of the multidirectional wheel system according to one or more embodiments of the disclosed subject matter implemented in a car, which is illustrated diagrammatically.

FIG. 3C diagrammatically depicts a view of a car 315 according to one or more embodiments of the disclosed subject matter. The car 315 can correspond to the stand-alone apparatus 102. The one or more multidirectional wheel devices 150 can extend a predetermined amount from the car 315, such that the car 315 is supported by the one or more multidirectional wheels devices 150 and the car 315 is not in contact with the surface on which the one or more multidirectional wheels devices 150 are contacting. Each multidirectional wheel device 150 can operate as part of the system 100 disposed within the car 315, such as described above.

Figure 3D:
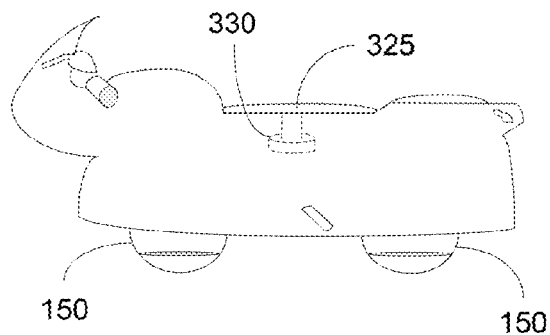
FIG. 3D depicts an exemplary side view of the multidirectional wheel system according to one or more embodiments of the disclosed subject matter implemented in a motorcycle, which is illustrated diagrammatically.

FIG. 3D diagrammatically depicts a side view of a motorcycle 320 according to one or more embodiments of the disclosed subject matter. The motorcycle 320 can correspond to the stand-alone apparatus 102. The one or more multidirectional wheel devices 150 can extend a predetermined amount from the motorcycle 320, such that the motorcycle 320 is supported by the one or more multidirectional wheels devices 150 and the motorcycle 320 is not in contact with the surface on which the one or more multidirectional wheels devices 150 are contacting. Each multidirectional wheel device 150 can operate as part of the system 100 disposed within the motorcycle 320, such as described above.

Additionally, in an exemplary embodiment, the electronic control device 160 can be a joystick 330. The joystick 330 can be disposed within the motorcycle 320 such that the top of the joystick 330 is connected to the seat 325. The seat 325 can be moveably attached to the motorcycle 320 such that a rider shifting their weight on the motorcycle 320 can cause the joystick 330 to move in the direction the weight was shifted, thereby controlling the direction of the rotation of the one or more multidirectional wheel devices 150, which therefore controls the direction in which the motorcycle 320 travels.

Optionally, or additionally, the electronic control device 160 can be handheld, and can move the roller skate 305, the skateboard 310, the car 315, or any stand-alone apparatus 102 in a predetermined direction corresponding to the signal received from the electronic control device 160.

Figure 4:
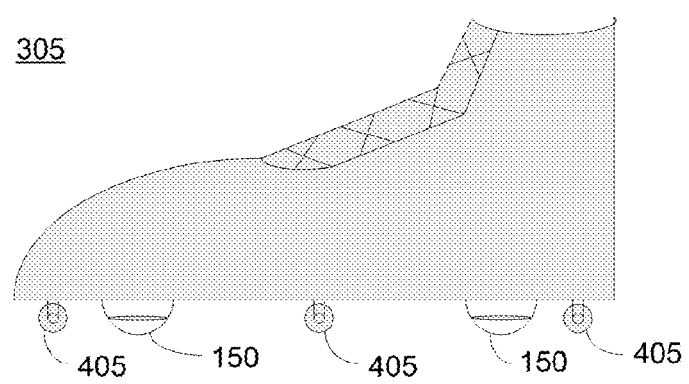
FIG. 4 depicts a side view of the roller skate of FIG. 3A implementing a retractable wheel balancing system.

FIG. 4 diagrammatically depicts a view of the roller skate 305 including retractable balancing wheels 405 according to one or more embodiments of the disclosed subject matter. In addition to multidirectional wheel devices 150, roller skate 305 can include one or more retractable balancing wheels 405. The retractable balancing wheels 405 can be stored inside the roller skate 305, or any stand-alone apparatus 102 (e.g., skate board 310, car 315, motorcycle 320, etc.), and can be activated manually via the electronic control device 160 or automatically in response to a signal(s) sent by one or more sensors.

For example, a predetermined button on the electronic remote device 160 can activate the one or more retractable wheels 405 such that the retractable wheels 405 extend to contact the same surface on which the multidirectional wheel devices 150 are in contact, thereby improving balance and further distributing weight. The retractable wheels 405 can be extended automatically in response to signals from one or more of the sensors 110. For example, the accelerometer and/or gyroscope may detect a predetermined level of unstableness or unbalance, which may correspond to the user of the roller skate 305 falling over or about to fall over, and automatically extend the retractable wheels 405 to increase or assist balance. Additionally, for example, if a pressure plate, which may be disposed between the connection member 215a-215d and the connection point of the connection member 215a-215d in the stand-alone apparatus 102 to measure weight supported by the one or more multidirectional wheel device 150, detects a weight greater than a predetermined threshold, the processing circuitry 130, which received the signal from the pressure plate, can cause the retractable wheels 405 to extend to help displace the weight and support the roller skate 305 or any stand-alone apparatus 102 in which the retractable wheels 405 are included in the system 100.

Figure 5:
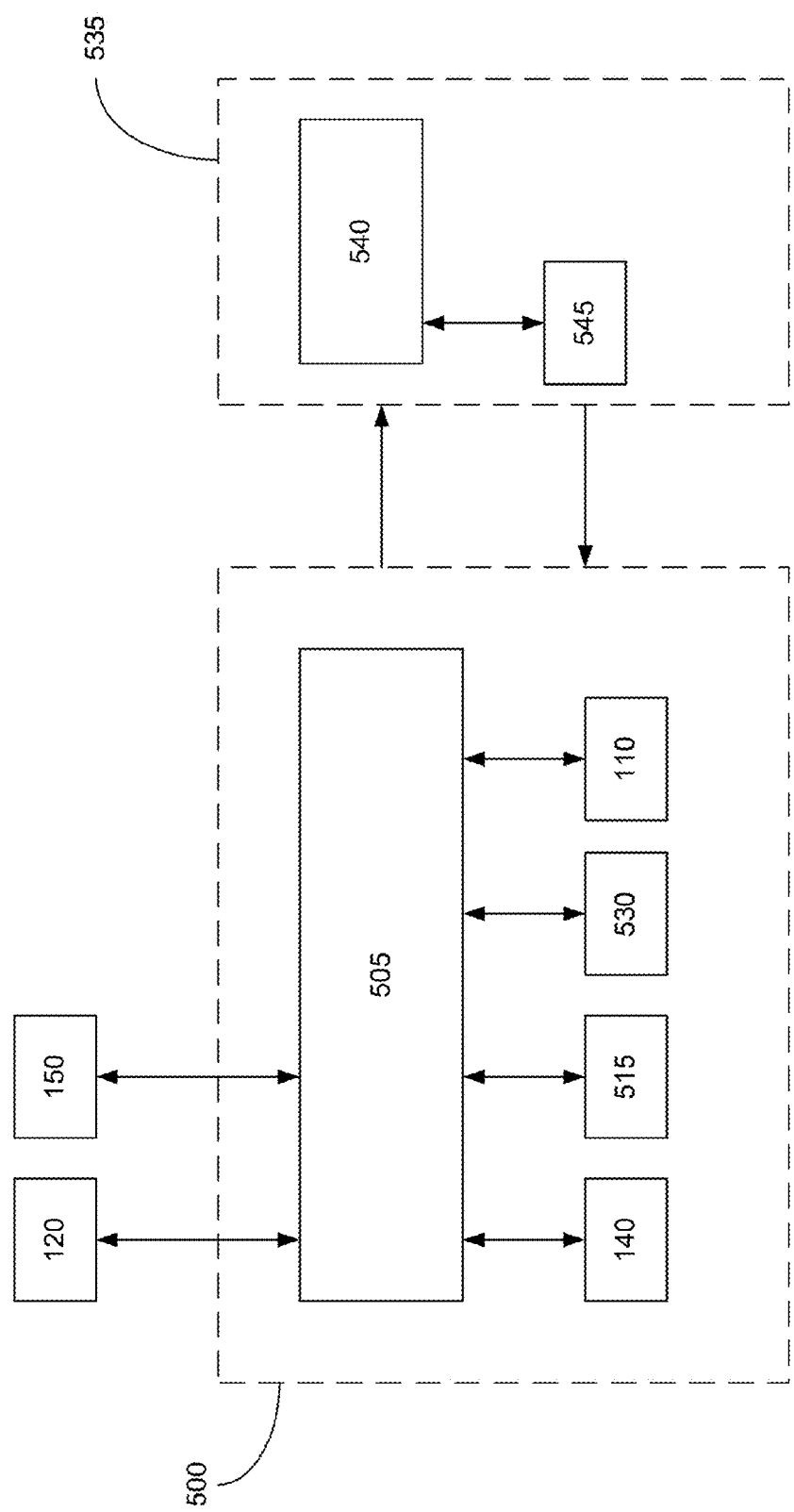
FIG. 5 depicts an exemplary control system of the multidirectional wheel system according to one or more embodiments of the disclosed subject matter.

FIG. 5 depicts control aspects of a system 500 according to one or more embodiments of the disclosed subject matter. Optionally, system 500 can represent control aspects (i.e., controlee components and controller components) of system 100 for FIG. 1.

In FIG. 5, the system 500 can include a control module 505, a plurality of sensors 510, the multidirectional wheel device 150, the braking system 120, a positioning system 515, a power source 140, wireless receiver/transmitter 530, and a remote control system 535.

The control module 505, which may be representative of processor/processing circuitry 130, can be configured to perform or cause performance of multiple functions, including receiving, monitoring, recording, storing, indexing, processing, and/or communicating data. The control module 505 can be integrated as one or more components, including memory, a central processing unit (CPU), Input/Output (I/O) devices or any other components that may be used to run an application. The control module 505 can be programmed to execute a set of predetermined instructions. Various instructions including lookup tables, maps, and mathematical equations can be stored in memory, however, it should be appreciated that the storing or reading of such information can be accomplished with alternative types of computer-readable media including hard disks, floppy disks, optical media, CD-ROM, or other forms of RAM or ROM. Additionally, other circuitry including power supply circuitry, signal-conditioning circuitry, solenoid driver circuitry, and communication circuitry can be included in the control module 505. Further, it should be appreciated that the control module 505 can include multiple controllers wherein each controller is dedicated to perform one or more of the above mentioned functions.

The system 100 can be controlled remotely by a remote control system 535 communicably coupled to the control system 500.

The control module 505 can be communicably coupled to the one or more sensors 110. Each of the sensors 110 can provide output signals indicative of parameters related to the movement and support of any stand-alone apparatus 102 via the system 100. The sensors 110 can be located in various positions on the stand-alone apparatus 102, such as the seat 325 of the motorcycle 320, for example. The control module 505 can receive signals from each of sensors 110.

Optionally, the control system 500 can include a positioning system 515 configured to determine the location of the system 100. In an embodiment, the positioning system 515 can be a satellite positioning system such as GPS. The control module 505 is communicably coupled to the positioning system 515 to continuously or periodically track the location of the system 100.

Further, the positioning system 515, through programming of the control module 505, can create a path such that the system 100 can automatically cause the one or more multidirectional wheel devices 150 to transport the stand-alone apparatus 102. For example, a predetermined route to work can be programmed into the control module 505 such that the user of the system 100 can use their stand-alone apparatus to be automatically transported along the predetermined route to work.

In one or more embodiments, the power source 140 can include at least one rechargeable battery, which can be integrated within the system 100. The control module 505 can be configured to regulate and appropriately distribute the power supplied by the power source 140. It should be appreciated that the at least one rechargeable battery can be recharged through a variety of recharging methods including plugging into an electrical outlet or being electrically coupled with an integrated solar panel.

The control system 500 can be configured to wired and/or wirelessly receive signals from the remote control system 535 through a communicably coupled receiver/transmitter 530. Wireless communication can be any suitable form of wireless communication including radio communication, a cellular network, or satellite-based communication. The remote control system 535 can include a display 540, a first user input device 545, such as a keyboard, a joystick, keypad, mouse, touch screen interface of display 540, or combination of two or more thereof. The remote control system 535 can be various devices capable of wireless communication, including a personal computer, laptop, smart phone, tablet, or remote control. The remote control system 535 can be used to program the control module 505 to execute a predetermined set of instructions. Further, the remote control system 535 can allow a user to remotely control various components of the system 100, such as the positioning system 515, the control module 505, etc.

Figure 6:
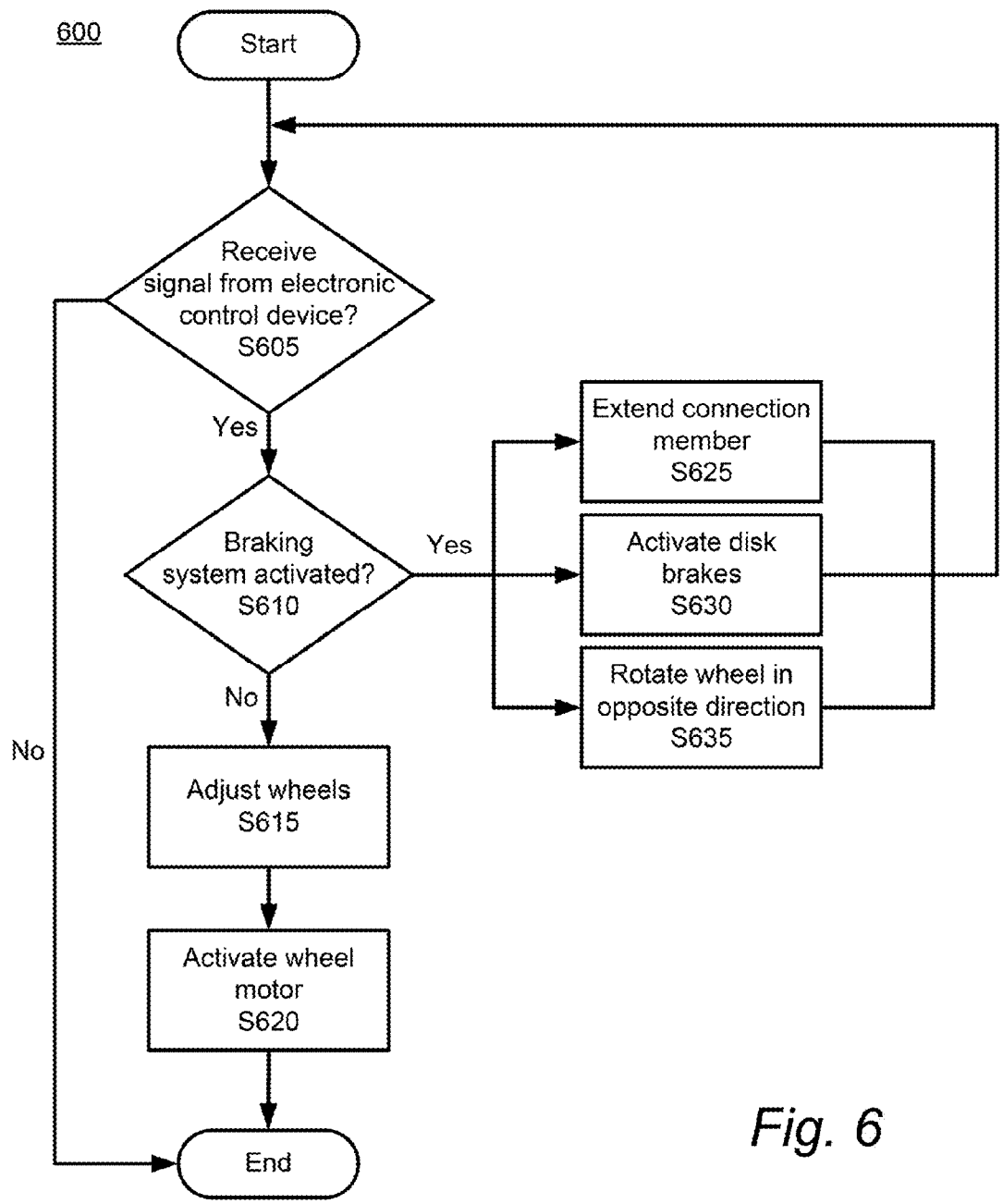
FIG. 6 is a flow chart of a method for operating the multidirectional wheel control device or system.

FIG. 6 depicts an exemplary flow chart of a method 600 for causing the system 100 to transport the stand-alone apparatus 102 according to one or more embodiments of the disclosed subject matter.

In S605, it can be determined whether a signal from an electronic control device (e.g., device 160) is received, using the processing circuitry 130, for example. The signal can indicate that the electronic control device 160 is activated (e.g., sending a signal to move or stop the stand-alone apparatus 102). If no signal is received then the process can end. However, if the signal is received from the electronic control device 160, then it can be determined whether a braking system is activated in S610.

In S610, it can be determined whether the braking system is activated. The braking system can be activated by one or more of the sensors 110 and/or the electronic control device 160 as described herein. If the braking system is activated, the connection members 215a-215d can be extended in S625, the disk brakes 220 can be activated in S630, and/or the wheels 210a-210d can be caused to rotate in the direction opposite the rotation of the multidirectional wheel device 150. However, if the braking system is not activated, then the wheels 210a-210d can be adjusted in S615.

In S625, the circuitry can cause at least one of the extendable/retractable connection members 215a-215d to extend to an extended state to stop or slow down the omnidirectional spherical wheel 205 when it has been determine that the braking system has been activated. Therefore, a force can be applied to the omnidirectional spherical wheel 205, wherein the force is a compressive force on the omnidirectional spherical wheel 205, in a direction of extension of the extendable/retractable member toward the omnidirectional spherical wheel 205.

In S630, the mechanical braking mechanism, such as disk brakes 220, can be activated to slow and or stop the rotation of wheels 210a-210d, thereby causing the friction between the wheels or rollers 210a-210d to increase effectively slowing and/or eventually stopping the rotation of the sphere 205, therefore effectively braking the multidirectional wheel device 150.

In S635, the circuitry can cause the motor to rotate, or attempt to rotate, the motorized roller, such as the wheels 210a-210d, in a direction opposite a direction of rotation of the omnidirectional spherical wheel 205 when the braking system has been activated. Therefore, the motorized rollers can slow down, stop, maintain speed, or change direction of the omnidirectional spherical wheel 205.

It should be appreciated that S625, S630, and S635 can be activated independently or in a predetermined combination thereof in response to the braking system being activated in S610.

In S615, the wheel control assemblies, which include wheels/rollers 210a-210d, can be adjusted to a position corresponding to the signal received from the electronic control device 160 in S605. The adjustment can occur by rotating the wheels 210a-210d via the swivelable connection between the wheels 210a-210d and the corresponding connection members 215a-215d. For example, the wheels 210a-210d can be positioned such that rotation of the wheels 210a-210d can cause the sphere 205 to rotate in a predetermined direction, thereby causing the stand-alone apparatus 102 supported by the one or more multidirectional wheel devices 150 to move in the predetermined direction. After the wheels are adjusted based on the signal received from the electronic control device 160, the motor in each wheel 210a-210d can be activated in S620.

In S620, the motor in each wheel 210a-210d can be activated to cause operation of a motor of the motorized rollers 210a-210d such that the motorized rollers 210a-210d act on the omnidirectional spherical wheel 205 to apply a force to the omnidirectional spherical wheel 205 to maintain speed, increase speed, or change direction of the omnidirectional spherical. Once the motor is activated in S620, thereby causing the desired movement of the stand-alone apparatus 102 supported by the one or more multidirectional wheel devices 150, the process can end.

(1) An apparatus comprising: a multidirectional wheel system; and circuitry configured to determine if a signal is received from an electronic control device, determine if a braking system is activated, activate at least one of extending one or more connection members, disk brakes, and rotating one or more wheels in a direction opposite that of the rotation of a sphere supporting at least a portion of the apparatus when the braking system is activated, adjust the one or more wheels to a predetermined position in response to the signal being received from the electronic control device, and activate a motor disposed in each of the one or more wheels when the one or more wheels are adjusted to the predetermined position causing the sphere to rotate in a predetermined direction, thereby causing the apparatus to move in the predetermined direction.

(2) The apparatus of (1), wherein the electronic control device is a joystick.

(3) The apparatus of (1) or (2), wherein the joystick causes the apparatus to move in the predetermined direction.

(4) The apparatus of any one of (1) to (3), wherein the joystick is disposed within a seat moveably attached to a motorcycle, such that shifting the seat in the predetermined direction corresponds to the joystick moving the predetermined direction of the seat, thereby causing the apparatus to move in the predetermined direction.

(5) The apparatus of any one of (1) to (4), wherein the joystick manually causes the retractable wheels to extend via an input device.

(6) The apparatus of any one of (1) to (5), wherein the joystick manually activates the braking system via the input device.

(7) The apparatus of any one of (1) to (6), wherein the one or more wheels are swivelably connected to the one or more corresponding connection members.

(8) The apparatus of any one of (1) to (7), wherein the predetermined position of the one or more wheels are adjusted via the swivelable connection.

(9) The apparatus of any one of (1) to (8), wherein the one or more wheels are configured to rotate in a first direction.

(10) The apparatus of any one of (1) to (9), wherein the one or more wheels are configured to rotate in second direction opposite the first direction without adjusting the predetermined position.

(11) The apparatus of any one of (1) to (10), wherein the multidirectional wheel system includes one or more multidirectional wheel devices.

(12) The apparatus of any one of (1) to (11), wherein the one or more multidirectional wheel devices support the apparatus.

(13) The apparatus of any one of (1) to (12), wherein the one or more multidirectional wheel devices cause the apparatus to move in the predetermined direction.

(14) The apparatus of any one of (1) to (13), wherein the one or more multidirectional wheel devices extend from the apparatus a predetermined amount, such that the apparatus does not contact the surface on which the one or more multidirectional wheel devices rotate.

(15) The apparatus of any one of (1) to (14), wherein the multidirectional wheel system includes one or more sensors including an accelerometer, a gyroscope, and a pressure plate.

(16) The apparatus of any one of (1) to (15), wherein at least one retractable wheel extends in response to a signal from the pressure plate indicative of a weight exceeding a predetermined weight threshold, such that the at least one retractable wheel distributes the excess weight.

(17) The apparatus of any one of (1) to (16), wherein the at least one retractable wheel can be extended in response to a signal from the accelerometer indicative of the apparatus being off balance beyond a predetermined threshold, such that the at least one retractable wheel returns the balance of the apparatus to a position that does not exceed the predetermined threshold.

(18) The apparatus of any one of (1) to (17), wherein the braking system is activated automatically in response to a signal from the one or more sensors indicative of the apparatus traveling above a predetermined speed.

(19) A method for causing the apparatus to move comprising: determining, via processing circuitry, if a signal is received from an electronic control device; determining, via processing circuitry, if a braking system is activated; activating at least one of extending one or more connection members, disk brakes, and rotating one or more wheels in a direction opposite that of the rotation of a sphere supporting at least a portion of the apparatus when the braking system is activated; adjusting the one or more wheels to a predetermined position in response to the signal being received from the electronic control device; and activating a motor disposed in each of the one or more wheels when the one or more wheels are adjusted to the predetermined position causing the sphere to rotate in a predetermined direction, thereby causing the apparatus to move in the predetermined direction.

(20) A system comprising: at least one sensor; a braking system; one or more multidirectional wheel devices; and circuitry configured to determine if a signal is received from an electronic control device, determine if a braking system is activated, activate at least one of extending one or more connection members, disk brakes, and rotating one or more wheels in a direction opposite that of the rotation of a sphere supporting at least a portion of the apparatus when the braking system is activated, adjust the one or more wheels to a predetermined position in response to the signal being received from the electronic control device, and activate a motor disposed in each of the one or more wheels when the one or more wheels are adjusted to the predetermined position causing the sphere to rotate in a predetermined direction, thereby causing the apparatus to move in the predetermined direction.

(21) A wheel control system comprising: an omnidirectional spherical wheel; a wheel control assembly physically and operatively coupled to the omnidirectional spherical wheel to control movement of the omnidirectional spherical wheel, the wheel control assembly including a plurality of extendable/retractable members each having a motorized roller at an end thereof and controllable to an extended state where the roller contacts the omnidirectional spherical wheel and to a non-extended state where the roller does not contact the omnidirectional spherical wheel; and circuitry to control the wheel control assembly, the circuitry being configured to determine whether an electronic control device is activated, determine whether a braking system is activated, and control individually each of the extendable/retractable members to collectively stop, slow down, maintain speed of, speed up, or change direction of the omnidirectional spherical wheel based on the determinations as to whether the electronic control device and the braking system are activated, wherein a first set of at least one of the extendable/retractable members is disposed to contact an upper hemisphere portion of the omnidirectional spherical wheel in the extended state, a second set of at least one of the extendable/retractable members is disposed to contact a western hemisphere portion of the omnidirectional spherical wheel in the extended state, and a third set of at least one of the extendable/retractable members is disposed to contact an eastern hemisphere portion of the omnidirectional spherical wheel in the extended state.

(22) The wheel control system of (21), wherein, when the circuitry determines that the braking system is activated, the circuitry causes at least one of the extendable/retractable members to extend to the extended state, or, if the at least one of the extendable/retractable members is in the extended state, either causes operation of a motor of the motorized roller such that the motorized roller acts on the omnidirectional spherical wheel to apply a force to the omnidirectional spherical wheel to slow down, stop or change direction of the omnidirectional spherical wheel, or activates a mechanical braking mechanism of the motorized roller.

(23) The wheel control system of (21) or (22), wherein the circuitry causes the motor to rotate or attempt to rotate the motorized roller in a direction opposite a direction of rotation of the omnidirectional spherical wheel when the circuitry determines that the braking system is activated, to slow down, stop, maintain speed, or change direction of the omnidirectional spherical wheel.

(24) The wheel control system of any one of (21) to (23), wherein the force is a compressive force on the omnidirectional spherical wheel, in a direction of extension of the extendable/retractable member toward the omnidirectional spherical wheel.

(25) The wheel control system of any one of (21) to (24), wherein, when the circuitry determines that the electronic control device is activated, the circuitry performs one of the following: causes at least one of the extendable/retractable members to extend to the extended state, causes the at least one of the extendable/retractable member to retract toward the non-extended state when the at least one of the extendable/retractable member is in the extended state, and when the at least one of the extendable/retractable member is in the extended state, causes operation of a motor of the motorized roller such that the motorized roller acts on the omnidirectional spherical wheel to apply a force to the omnidirectional spherical wheel to maintain speed, increase speed, or change direction of the omnidirectional spherical wheel.

(26) The wheel control system of any one of (21) to (25), wherein the circuitry causes the motor to rotate the motorized roller in a direction the same as a direction of rotation of the omnidirectional spherical wheel when the circuitry determines that the electronic control device is activated to maintain speed, increase speed, or change direction of the omnidirectional spherical wheel.

(27) The wheel control system of any one of (21) to (26), wherein the force is a decompressive force on the omnidirectional spherical wheel, in a direction of retraction of the extendable/retractable member away from the omnidirectional spherical wheel.

(28) The wheel control system of any one of (21) to (27), wherein the electronic control device includes a joystick.

(29) The wheel control system of any one of (21) to (28), wherein movement of the joystick causes the omnidirectional spherical wheel to move in correspondence therewith.

(30) The wheel control system of any one of (21) to (29), wherein the joystick is disposed within a seat moveably attached to a motorcycle, such that shifting the seat corresponds to movement of the joystick, thereby causing the omnidirectional spherical wheel to move in correspondence with the joystick and seat.

(31) The wheel control system of any one of (21) to (30), further comprising a plurality of said omnidirectional spherical wheels and respective said wheel control assemblies.

(32) The wheel control system of any one of (21) to (31), wherein the circuitry is configured to control each of said wheel control assemblies.

(33) The wheel control system of any one of (21) to (32), further comprising one or more sensors including an accelerometer, a gyroscope, and a pressure plate.

(34) The wheel control system of any one of (21) to (33), wherein the individual control of the extendable/retractable members includes extending at least one of the extendable/retractable members to the extended state in response to a signal from a pressure plate indicative of a weight exceeding a predetermined weight threshold.

(35) The wheel control system of any one of (21) to (34), wherein, in the non-extended state the motorized rollers do not contact the omnidirectional spherical wheel.

(36) The wheel control system of any one of (21) to (36), wherein the braking system is activated automatically in response to a signal from the one or more sensors indicative of the omnidirectional spherical wheel traveling above a predetermined speed or anticipated to travel above the predetermined speed.

(37) The wheel control system of any one of (21) to (36), wherein, for each of the extendable/retractable members the motorized wheel is prevented from rolling in the non-extended state and is free to roll or be driven to roll in the extended state.

(38) A method for causing an apparatus having a plurality of multidirectional wheels and an omnidirectional wheel to move comprising: determining, using processing circuitry, whether a signal is received from an electronic control device; determining, using the processing circuitry, whether a braking system is activated; activating at least one of one or more wheel control members associated with each of the multidirectional wheels and disk brakes responsive to the braking system being activated; adjusting one or more of the multidirectional wheels to a predetermined position relative to the omnidirectional wheel in response to the signal being received from the electronic control device; and activating a motor disposed to control each of the multidirectional wheels when the one or more multidirectional wheels are adjusted to the predetermined position and causing the multidirectional wheel to rotate in a predetermined direction, thereby causing the apparatus to move in the predetermined direction.

(39) A vehicle comprising: a plurality of multidirectional wheels; a wheel control assembly operatively coupled to each of the multidirectional wheels to control movement of the multidirectional wheel, each wheel control assembly including at least one extendable/retractable member having a roller at an end thereof and controllable to move to an extended state where the roller contacts the multidirectional wheel and to a fully retracted state where the roller does not contact the multidirectional wheel; and control circuitry to control the wheel control assemblies, the control circuitry being configured to control individually each of the extendable/retractable members to collectively stop, slow down, maintain speed of, speed up, or change direction of the vehicle based on one or more user inputs to control speed and direction of the vehicle and based on an input from one or more vehicle sensors.

(40) The vehicle of (39), further comprising at least one balancing wheel, different from the multidirectional wheels and the rollers, configured to be extended responsive to a signal from an accelerometer of the vehicle indicative of the vehicle being off balance beyond a predetermined threshold, and retracted when the vehicle is not off balance beyond the predetermined threshold.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

What is claimed is:

1. A wheel control system comprising:
an omnidirectional spherical wheel;
a wheel control assembly physically and operatively coupled to the omnidirectional spherical wheel to control movement of the omnidirectional spherical wheel, the wheel control assembly including a plurality of extendable/retractable members each having a motorized roller at an end thereof and controllable to an extended state where the roller contacts the omnidirectional spherical wheel and to a non-extended state where the roller does not contact the omnidirectional spherical wheel; and
circuitry to control the wheel control assembly, the circuitry being configured to
determine whether an electronic control device is activated,
determine whether a braking system is activated, and
control individually each of the extendable/retractable members to collectively stop, slow down, maintain speed of, speed up, or change direction of the omnidirectional spherical wheel based on the determinations as to whether the electronic control device and the braking system are activated,
wherein a first set of at least one of the extendable/retractable members is disposed to contact an upper hemisphere portion of the omnidirectional spherical wheel in the extended state, a second set of at least one of the extendable/retractable members is disposed to contact a western hemisphere portion of the omnidirectional spherical wheel in the extended state, and a third set of at least one of the extendable/retractable members is disposed to contact an eastern hemisphere portion of the omnidirectional spherical wheel in the extended state.

2. The wheel control system of claim 1, wherein, when the circuitry determines that the braking system is activated, the circuitry causes at least one of the extendable/retractable members to extend to the extended state, or, if the at least one of the extendable/retractable members is in the extended state, either causes operation of a motor of the motorized roller such that the motorized roller acts on the omnidirectional spherical wheel to apply a force to the omnidirectional spherical wheel to slow down, stop or change direction of the omnidirectional spherical wheel, or activates a mechanical braking mechanism of the motorized roller.

3. The wheel control system of claim 2, wherein the circuitry causes the motor to rotate or attempt to rotate the motorized roller in a direction opposite a direction of rotation of the omnidirectional spherical wheel when the circuitry determines that the braking system is activated, to slow down, stop, maintain speed, or change direction of the omnidirectional spherical wheel.

4. The wheel control system of claim 2, wherein the force is a compressive force on the omnidirectional spherical wheel, in a direction of extension of the extendable/retractable member toward the omnidirectional spherical wheel.

5. The wheel control system of claim 1, wherein, when the circuitry determines that the electronic control device is activated, the circuitry performs one of the following:
causes at least one of the extendable/retractable members to extend to the extended state,
causes the at least one of the extendable/retractable member to retract toward the non-extended state when the at least one of the extendable/retractable member is in the extended state, and
when the at least one of the extendable/retractable member is in the extended state, causes operation of a motor of the motorized roller such that the motorized roller acts on the omnidirectional spherical wheel to apply a force to the omnidirectional spherical wheel to maintain speed, increase speed, or change direction of the omnidirectional spherical wheel.

6. The wheel control system of claim 5, wherein the circuitry causes the motor to rotate the motorized roller in a direction the same as a direction of rotation of the omnidirectional spherical wheel when the circuitry determines that the electronic control device is activated to maintain speed, increase speed, or change direction of the omnidirectional spherical wheel.

7. The wheel control system of claim 5, wherein the force is a decompressive force on the omnidirectional spherical wheel, in a direction of retraction of the extendable/retractable member away from the omnidirectional spherical wheel.

8. The wheel control system of claim 1, wherein the electronic control device includes a joystick.

9. The wheel control system of claim 8, wherein movement of the joystick causes the omnidirectional spherical wheel to move in correspondence therewith.

10. The wheel control system of claim 9, wherein the joystick is disposed within a seat moveably attached to a motorcycle, such that shifting the seat corresponds to movement of the joystick, thereby causing the omnidirectional spherical wheel to move in correspondence with the joystick and seat.

11. The wheel control system of claim 1, further comprising a plurality of said omnidirectional spherical wheels and respective said wheel control assemblies.

12. The wheel control system of claim 11, wherein the circuitry is configured to control each of said wheel control assemblies.

13. The wheel control system of claim 1, further comprising one or more sensors including an accelerometer, a gyroscope, and a pressure plate.

14. The wheel control system of claim 1, wherein the individual control of the extendable/retractable members includes extending at least one of the extendable/retractable members to the extended state in response to a signal from a pressure plate indicative of a weight exceeding a predetermined weight threshold.

15. The wheel control system of claim 1, wherein, in the non-extended state the motorized rollers do not contact the omnidirectional spherical wheel.

16. The wheel control system of claim 1, wherein the braking system is activated automatically in response to a signal from the one or more sensors indicative of the omnidirectional spherical wheel traveling above a predetermined speed or anticipated to travel above the predetermined speed.

17. The wheel control system of claim 1, wherein, for each of the extendable/retractable members the motorized wheel is prevented from rolling in the non-extended state and is free to roll or be driven to roll in the extended state.

18. A method for causing an apparatus having a plurality of multidirectional wheels and an omnidirectional wheel to move comprising:
determining, using processing circuitry, whether a signal is received from an electronic control device;
determining, using the processing circuitry, whether a braking system is activated;

activating at least one of one or more wheel control members associated with each of the multidirectional wheels and disk brakes responsive to the braking system being activated;

adjusting one or more of the multidirectional wheels to a predetermined position relative to the omnidirectional wheel in response to the signal being received from the electronic control device; and activating a motor disposed to control each of the multidirectional wheels when the one or more multidirectional wheels are adjusted to the predetermined position and causing the multidirectional wheel to rotate in a predetermined direction, thereby causing the apparatus to move in the predetermined direction.

19. A vehicle comprising:

a plurality of multidirectional wheels;

a wheel control assembly operatively coupled to each of the multidirectional wheels to control movement of the multidirectional wheel, each wheel control assembly including at least one extendable/retractable member having a roller at an end thereof and controllable to move to an extended state where the roller contacts the multidirectional wheel and to a fully retracted state where the roller does not contact the multidirectional wheel; and control circuitry to control the wheel control assemblies, the control circuitry being configured to control individually each of the extendable/retractable members to collectively stop, slow down, maintain speed of, speed up, or change direction of the vehicle based on one or more user inputs to control speed and direction of the vehicle and based on an input from one or more vehicle sensors.

20. The vehicle of claim 19, further comprising at least one balancing wheel, different from the multidirectional wheels and the rollers, configured to be extended responsive to a signal from an accelerometer of the vehicle indicative of the vehicle being off balance beyond a predetermined threshold, and retracted when the vehicle is not off balance beyond the predetermined threshold.

\* \* \* \* \*